US012801631B2

(12) United States Patent
Oh et al.

(10) Patent No.: US 12,801,631 B2
(45) Date of Patent: Nov. 17, 2026

(54) METHOD AND APPARATUS OF ADDING ADDITIONAL CHAIN TO BLOCKCHAIN, AND METHOD AND APPARATUS OF GENERATING SHARD FOR THE SAME

(71) Applicant: ELECTRONICS AND TELECOMMUNICATIONS RESEARCH INSTITUTE, Daejeon (KR)

(72) Inventors: Jin-Tae Oh, Daejeon (KR); Young-Chang Kim, Daejeon (KR); Chang-Hyun Lee, Daejeon (KR); Jong-Choul Yim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/298,231

(22) Filed: Apr. 10, 2023

(65) Prior Publication Data

US 2024/0111785 A1 Apr. 4, 2024

(30) Foreign Application Priority Data

Sep. 27, 2022 (KR) ........................ 10-2022-0122614
Feb. 10, 2023 (KR) ........................ 10-2023-0017703

(51) Int. Cl.
*G06F 16/27* (2019.01)

(52) U.S. Cl.
CPC .................................. *G06F 16/273* (2019.01)

(58) Field of Classification Search
None
See application file for complete search history.

(56) References Cited

U.S. PATENT DOCUMENTS

2019/0068380 A1 2/2019 Tang
2019/0097790 A1 3/2019 Li
2019/0147438 A1 5/2019 Micali
2019/0260574 A1 * 8/2019 Shi .......................... H04L 9/321
2019/0327084 A1 10/2019 Oh
(Continued)

FOREIGN PATENT DOCUMENTS

EP 4 134 856 A2 2/2023
KR 10-1918446 B1 1/2019
(Continued)

OTHER PUBLICATIONS

Singh, et al. Sidechain technologies in blockchain networks: An examination and state-of-the-art review. Journal of Network and Computer Applications 149 (2020), pp. 1-16. (Year: 2020).*
(Continued)

*Primary Examiner* — Merilyn P Nguyen

(57) ABSTRACT

Disclosed herein is a method for adding an additional chain to a blockchain. The method includes depositing, by a node of the blockchain, an asset corresponding to the additional chain; selecting the node as one of consensus nodes for connecting an additional block to the additional chain based on a share value corresponding to the asset; and performing, by the node, distributed consensus for connecting the additional block. Here, nodes constituting the blockchain include major shareholder nodes for processing transactions.

11 Claims, 11 Drawing Sheets

(56) References Cited

U.S. PATENT DOCUMENTS

| | | | | |
|---|---|---|---|---|
| 2019/0340266 | A1* | 11/2019 | Vo | G06F 16/2365 |
| 2019/0379538 | A1 | 12/2019 | Oh | |
| 2020/0153899 | A1* | 5/2020 | Xie | H04L 63/10 |
| 2020/0162473 | A1* | 5/2020 | Mercuri | G06F 21/64 |
| 2020/0344132 | A1* | 10/2020 | Padmanabhan | H04L 9/0637 |
| 2020/0403776 | A1 | 12/2020 | Oh | |
| 2021/0217001 | A1* | 7/2021 | Harrison | H04L 9/50 |
| 2022/0027970 | A1 | 1/2022 | Kim et al. | |
| 2022/0261882 | A1* | 8/2022 | Youb | G06F 16/1805 |
| 2022/0271957 | A1 | 8/2022 | Zamani | |
| 2022/0366401 | A1* | 11/2022 | Fletcher | G06Q 20/065 |
| 2023/0410101 | A1* | 12/2023 | Chan | H04L 63/00 |

FOREIGN PATENT DOCUMENTS

| | | | |
|---|---|---|---|
| KR | 10-2019-0054738 | A | 5/2019 |
| KR | 10-2020-0096045 | A | 8/2020 |
| KR | 10-2022-0013846 | A | 2/2022 |
| KR | 10-2022-0089383 | A | 6/2022 |

OTHER PUBLICATIONS

For loops. Jan. 2022, pp. 1-4. https://wiki.python.org/moin/ForLoop. (Year: 2022).*

Jintae Oh et al., "Algorithm based on Byzantine agreement among decentralized agents (BADA)," ETRI Journal, Oct. 20, 2020.

Yossi Gilad et al., "Algorand: Scaling Byzantine Agreements for Cryptocurrencies," Proceedings of the 14th ACM Web Science Conference, Oct. 14, 2017.

Eleftherios Kokoris-Kogias et al., "OmniLedger: A Secure, Scale-Out, Decentralized Ledger via Sharding," 2018 IEEE Symposium on Security and Privacy, May 20, 2018.

Phil Daian et al., "Snow White: Robustly Reconfigurable Consensus and Applications to Provably Secure Proof of Stake," Topics in Cryptology, Sep. 30, 2019.

Takeaki Matsunaga et al., "An Incentivization Scheme for Participating Nodes in Proof-of-Stake-Based Blockchain," IEICE Tech. Rep., Nov. 19, 2020.

* cited by examiner

| NODE NUMBER | SHARE VALUE | TRANSACTIONS |
| --- | --- | --- |
| 1 | 9 | 10,000 |
| 2 | 9 | 10,000 |
| 3 | 9 | 10,000 |
| 4 | 9 | 10,000 |
| 5 | 9 | 10,000 |
| 6 | 9 | 10,000 |
| 7 | 9 | 10,000 |
| 8 | 9 | 10,000 |
| 9 | 9 | 10,000 |
| 10 | 9 | 10,000 |
| 11 | 1 | 0 |
| 12 | 1 | 0 |
| ⋮ | ⋮ | ⋮ |
| ⋮ | ⋮ | ⋮ |
| 99 | 1 | 0 |
| 100 | 1 | 0 |

FIG. 1

| NODE NUMBER | SHARE VALUE 1 | SHARE VALUE 2 |
|---|---|---|
| 1 | 9 | 1 |
| 2 | 9 | 1 |
| 3 | 9 | 1 |
| 4 | 9 | 1 |
| 5 | 9 | 1 |
| 6 | 9 | 1 |
| 7 | 9 | 1 |
| 8 | 9 | 1 |
| 9 | 9 | 1 |
| 10 | 9 | 1 |
| 11 | 1 | 9 |
| 12 | 1 | 9 |
| 13 | 1 | 9 |
| 14 | 1 | 9 |
| 15 | 1 | 9 |
| 16 | 1 | 9 |
| 17 | 1 | 9 |
| 18 | 1 | 9 |
| 19 | 1 | 9 |
| 20 | 1 | 9 |
| 21 | 1 | 1 |
| 22 | 1 | 1 |
| ⋮ | ⋮ | ⋮ |
| 99 | 1 | 1 |
| 100 | 1 | 1 |

FIG. 7

| USER ID | A | B | C | D | E | F | G | H | I | J | K |
|---|---|---|---|---|---|---|---|---|---|---|---|
| TOTAL BALANCE | 2000 | 5000 | 200 | 305 | 400 | 100 | 20 | 10 | 5 | 4 | 1 |
| BALANCE FOR $10^{th}$ CHAIN | | | 10 | 1 | | 10 | 10 | 1 | 2 | 1 | 1 |
| BALANCE FOR $15^{th}$ CHAIN | 300 | 300 | 1 | 300 | 300 | 1 | | | 1 | 3 | |

FIG. 9

| USER ID | SHARE VALUE | MAJOR/MINOR |
|---|---|---|
| USER C | 10 | MAJOR |
| USER G | 10 | MAJOR |
| USER F | 10 | MAJOR |
| USER D | 1 | MINOR |
| USER H | 1 | MINOR |
| USER I | 2 | MINOR |
| USER J | 1 | MINOR |
| USER K | 1 | MINOR |

FIG. 10

| USER ID | SHARE VALUE | MAJOR/MINOR |
|---|---|---|
| USER A | 300 | MAJOR |
| USER B | 300 | MAJOR |
| USER D | 300 | MAJOR |
| USER E | 300 | MAJOR |
| USER C | 1 | MINOR |
| USER F | 1 | MINOR |
| USER I | 1 | MINOR |
| USER J | 3 | MINOR |

METHOD AND APPARATUS OF ADDING ADDITIONAL CHAIN TO BLOCKCHAIN, AND METHOD AND APPARATUS OF GENERATING SHARD FOR THE SAME

CROSS REFERENCE TO RELATED APPLICATIONS

This application claims the benefit of Korean Patent Applications No. 10-2022-0122614, filed Sep. 27, 2022, and No. 10-2023-0017703, filed Feb. 10, 2023, which are hereby incorporated by reference in their entireties into this application.

BACKGROUND OF THE INVENTION

1. Technical Field

The present disclosure relates generally to technology for adding additional chains to a blockchain, and more particularly to technology for generating a shard in an operational (running) blockchain.

2. Description of the Related Art

Blockchain is technology for enabling transactions between untrusted parties to be processed without the intervention of a trusted third party and for enabling the results thereof to be recorded in a ledger. Because a decentralized blockchain is configured such that any of participating nodes is able to generate a new block, the content of a transaction has to be transferred to and processed by all nodes. However, because multiple nodes redundantly process the content of the transaction, on-chain processing performance of a blockchain is generally lower than the transaction-processing performance of a single node when a large number of nodes participate in the blockchain.

In addition to a method for improving consensus performance of a blockchain, a method of processing transactions off-chain and recording only the result thereof on-chain or methods for improving the processing performance of a blockchain by applying multiple chains have been proposed. Particularly, when multiple chains are used, transactions to be processed may be processed in parallel by being distributed across the multiple chains, whereby performance improvement may be achieved.

In multiple chains proposed by Ethereum or the like, nodes are assigned to each chains in each epoch. That is, nodes to be assigned to respective chains are reconfigured in each epoch, and the maximum number of multiple chains that can be accommodated by a single blockchain system is preset. In this case, a new chain is necessarily added at the boundary of epochs. Also, a number of new chains greater than the preset maximum number cannot be added in a blockchain system.

Here, the reason for reconfiguring nodes in each epoch is for transferring only transactions capable of being processed in each chain to nodes of the corresponding chain. Because, even though a node belonging to a specific chain receives a transaction other than the transactions to be processed thereby, the received transaction cannot be processed in the corresponding chain. That is, parallel processing is performed through respective chains by transferring the transactions to be processed to only the nodes belonging to the corresponding chain, whereby processing performance may be improved. Accordingly, it is difficult for a single node to simultaneously participate in consensus processes of two or more chains in a specific epoch.

In the above-described existing technology, transaction processing is delayed or impossible at the epoch boundary, and reconfiguration of nodes have to be performed during hours in which there are no transactions, e.g., at night, or like. Also, because a single node is assigned to only one of multiple chains, when the number of nodes participating in a blockchain is not large, the possibility of Byzantine faults is increased.

A paper published on Oct. 20, 2020 and titled "Algorithm based on Byzantine agreement among decentralized agents (BADA)", U.S. Patent No. 2019-0327084, U.S. Patent No. 2019-0379538, and U.S. Patent No. 2020-0403776 disclose in detail a method of selecting a consensus congress based on a nonce chain and a method of generating a blockchain using the same. The technology disclosed in the above paper and patents is a method in which a node performs a coin toss once with a success probability of p and a failure probability of 1-p and a consensus node is selected depending on the result of the coin toss. Accordingly, this method enables a random consensus congress to be formed, but because transactions have to be transferred to all nodes, the cost of transferring the transactions inevitably degrades the overall blockchain performance.

Therefore, new technology in which arbitrary nodes are selected as a consensus congress for each block from among participating nodes so as to generate a new block and connect the same to a blockchain even though only some nodes receive transactions to be processed and in which an additional chain can be added any time during the operation of the blockchain is urgently required.

SUMMARY OF THE INVENTION

An object of the present disclosure is to enable a chain (shard) to be added any time during the operation of a blockchain and to enable nodes to simultaneously participate in two or more chains as a consensus congress.

Another object of the present disclosure is to enable some nodes to dynamically participate in a new chain without the need to reassign nodes to multiple chains in each epoch.

A further object of the present disclosure is to give a node participating in a blockchain the authority to vote for consensus for a specific chain such that the node is able to participate in a consensus congress of the chain so as to operate the corresponding chain.

Yet another object of the present disclosure is to enable a new chain to be added in real time without node reconfiguration for reassigning nodes to each chain in an operational blockchain and to improve processing performance of the entire blockchain through parallel processing by the added chains.

In order to accomplish the above objects, a method for adding an additional chain to a blockchain according to the present disclosure includes depositing, by a node of the blockchain, an asset corresponding to the additional chain; selecting the node as one of consensus nodes for connecting an additional block to the additional chain based on a share value corresponding to the asset; and performing, by the node, distributed consensus for connecting the additional block.

Here, nodes participating in the additional chain may include major shareholder nodes for processing transactions.

Here, the nodes participating in the additional chain may include minor shareholder nodes other than the major shareholder nodes, and no transactions may be transferred to the minor shareholder nodes.

Here, the consensus nodes may include at least one major shareholder node and at least one minor shareholder node.

Here, the consensus nodes may include only the major shareholder nodes at first.

Here, whether a new node is allowed to participate in the additional chain may be determined based on a first total share value corresponding to the major shareholder nodes and a second total share value corresponding to the minor shareholder nodes.

Here, whether the new node is allowed to participate may be determined based on a result of comparing the first total share value with the sum of the second total share value and the share value of the new node.

Here, the first total share value may be increased by an expansion process for enabling the new node to participate in the additional chain.

Here, the expansion process may be any one of a first process for increasing a share value corresponding to any one or more of the major shareholder nodes, a second process for adding a new major shareholder node, and a third process for changing at least one of the minor shareholder nodes to a major shareholder node.

Here, data on the additional chain may be recorded in a block of the blockchain.

Here, the data on the additional chain may include participating node information of the nodes participating in the additional chain and share values of the nodes participating in the additional chain.

Here, the data on the additional chain may include start information of the additional chain, and the start block of the additional chain may record information about at least one block of the blockchain in which the data on the additional chain is recorded.

Here, at least one of the minor shareholder nodes may participate in a chain other than the additional chain as a minor shareholder node.

Here, the major shareholder nodes may not be allowed to participate in a chain other than the additional chain as major shareholder nodes.

Also, an apparatus for adding an additional chain to a blockchain according to an embodiment of the present disclosure includes one or more processors and executable memory for storing at least one program executed by the one or more processors.

Here, the at least one program deposits an asset corresponding to an additional chain to be added to a blockchain, is selected as one of consensus nodes for connecting an additional block to the additional chain based on a share value corresponding to the asset, and performs distributed consensus for connecting the additional block. Here, nodes participating in the additional chain may include major shareholder nodes for processing transactions.

Here, the nodes participating in the additional chain may include minor shareholder nodes other than the major shareholder nodes, and no transactions may be transferred to the minor shareholder nodes.

Here, whether a new node is allowed to participate in the additional chain may be determined based on a first total share value corresponding to the major shareholder nodes and a second total share value corresponding to the minor shareholder nodes.

Here, at least one of the minor shareholder nodes may participates in a chain other than the additional chain as a minor shareholder node.

Here, the major shareholder nodes may not be allowed to participate in a chain other than the additional chain as major shareholder nodes.

Also, a method for generating a shard of a blockchain according to an embodiment of the present disclosure includes participating in an additional chain as a major shareholder node, participating in the additional chain as a minor shareholder node, and forming a consensus congress including any one or more of the major shareholder node, or the minor shareholder node, or a combination thereof.

Here, the major shareholder node may be for processing transactions, and no transaction may be transferred to the minor shareholder node.

BRIEF DESCRIPTION OF THE DRAWINGS

The above and other objects, features, and advantages of the present disclosure will be more clearly understood from the following detailed description taken in conjunction with the accompanying drawings, in which:

FIG. 1 is a table illustrating the state of shares possessed by nodes, including major shareholder nodes, and transaction processing according to an embodiment of the present invention;

FIG. 7 is a table illustrating an example of the case in which nodes forming a blockchain have different types of share values according to an embodiment of the present invention;

FIG. 9 is a table illustrating an example of assets possessed by nodes participating in a blockchain;

FIG. 10 is a table illustrating an example of participating node information of nodes participating in the 10th chain in the example illustrated in FIG. 9;

DESCRIPTION OF THE PREFERRED EMBODIMENTS

Figure 2:
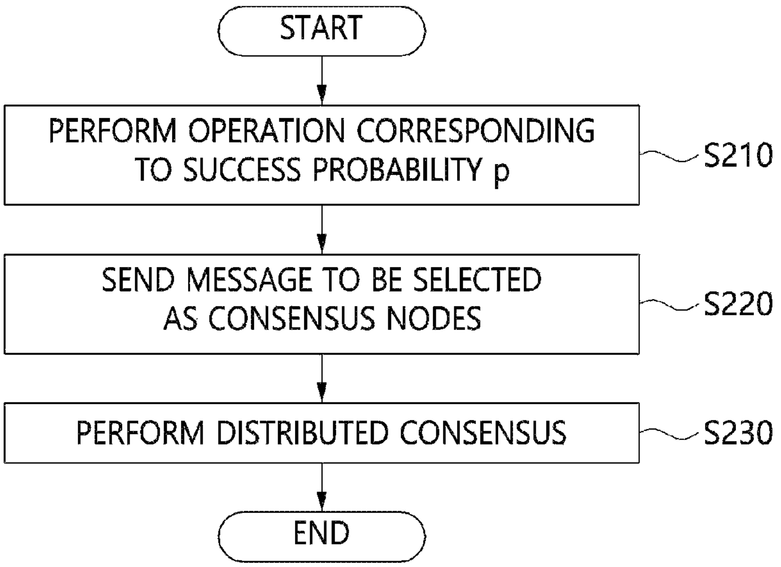
FIG. 2 is a flowchart illustrating a distributed consensus method according to an embodiment of the present invention.

The advantages and features of the present invention and methods of achieving the same will be apparent from the exemplary embodiments to be described below in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only, and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated components or steps, but do not preclude the presence or addition of one or more other components or steps.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, embodiments of the present invention will be described in detail with reference to the accompanying drawings. In the following description of the present invention, the same reference numerals are used to designate the same or similar elements throughout the drawings, and repeated descriptions of the same components will be omitted.

Generally, when the number of participating nodes increases in a blockchain using non-competitive consensus, consensus message complexity is increased, whereby performance is degraded. In this case, performance may be improved by reducing the number of nodes directly participating in consensus by selecting some of the nodes as a consensus congress. However, when only some fixed nodes are used as a consensus congress, a centralization problem may be caused again. Accordingly, technology for randomly reconfiguring a consensus congress for each block is required.

Also, the randomly selected consensus nodes may improve performance using a consensus algorithm having message complexity of O(N). Here, because all nodes have the possibility of being selected as consensus nodes, the traffic cost for transferring transactions to be processed to all participating nodes increases in proportion to the number of nodes, which may degrade performance. Accordingly, a method for reducing the amount of data over the entire network is required. For example, there is research for reducing the amount of data through optimization using a gossip protocol or the like, but because it is impossible to predict the nodes to be selected as a consensus congress when the consensus congress is randomly selected, the number of transactions transferred to the respective nodes cannot be reduced.

In the above-mentioned paper titled "Algorithm based on Byzantine agreement among decentralized agents (BADA)", U.S. Patent No. 2019-0379538, and the like, a method for performing Byzantine fault-tolerant consensus by a randomly selected consensus congress is disclosed.

According to this consensus algorithm, p (which is a success probability) and f (which is a Byzantine size and an integer equal to or greater than 1) that satisfy both Equation (1) and Equation (2) below may be calculated, and 3f+1 may be set as the size of a consensus congress. Here, n is the number of all participating nodes, and b is the number of Byzantine nodes, and is set to $n \times b_p$ when the proportion of Byzantine nodes included in all of the nodes is $b_p$.

Equation (1) below means that, when each of b Byzantine nodes performs a coin toss with a success probability of p and a failure probability of 1-p, the probability of the number of Byzantine nodes that win the coin toss exceeding f is equal to or less than $P_{max\_bzt}$. Also, Equation (2) below means that, when a total of n nodes perform a coin toss with a success probability of p and a failure probability of 1-p, the probability that the number of nodes that win the coin toss is equal to or less than 3f is equal to or less than $P_{min\_node}$.

$$1 - \sum_{k=0}^{f} \binom{b}{k} p^k (1-p)^{(b-k)} \le P_{max\_bzt} \tag{1}$$

$$\sum_{x=0}^{3f} \binom{n}{x} p^x (1-p)^{(n-x)} \le P_{min\_node} \tag{2}$$

According to the consensus algorithm introduced in the above-mentioned paper and the like, when a total of n nodes perform a coin toss with a success probability of p satisfying the conditions of the above two equations, and when the number of nodes that win the coin toss is equal to or greater than 3f+1, a consensus congress is formed by randomly selecting 3f+1 nodes. In this case, because the nodes that win the coin toss are not known in advance, all nodes have the possibility of being selected as a consensus congress, so transactions to be processed have to be transferred to all of the nodes. This is a problem not only in the consensus algorithm introduced in the above-mentioned paper but also in all consensus algorithms in which a consensus congress is formed by randomly selecting nodes and only the nodes belonging to the formed consensus congress participate in consensus.

According to an embodiment of the present invention, Byzantine fault-tolerant distributed consensus is performed based on the proportion of shares of nodes in distributed consensus in blockchain. Particularly, according to an embodiment of the present invention, only some selected nodes process transactions, and a consensus congress randomly selected for each block from among all nodes may generate a new block and connect the same to a blockchain.

According to an embodiment of the present invention, not the number of all nodes but the sum of shares issued to all nodes may be used as n in the above two equations, and not the number of Byzantine nodes (the maximum number of Byzantine nodes) but shares possessed by the Byzantine nodes (the maximum Byzantine shares included in all of the shares) may be used as b in the above two equations.

Because not nodes but shares are applied to the above equations, some nodes (the major shareholder nodes to be described later) process transactions, and all nodes are eligible to participate in consensus. Accordingly, distributed consensus is performed by forming a random consensus congress, and a block that is agreed upon may be connected to a blockchain.

When a consensus congress is formed using Equations (1) and (2) above based on the number of nodes, all nodes having the possibility of constituting a consensus congress have to receive transactions, whereby performance degradation resulting from the load imposed due to transaction processing may be caused.

According to an embodiment of the present invention, the nodes to process transactions are selected, consensus nodes are selected using these nodes, and distributed consensus is performed by the consensus nodes, whereby a new block may be connected to a blockchain.

First, nodes for processing transactions may be selected as follows.

Nodes forming a blockchain are sorted in descending order of the share value (share size) possessed thereby, and nodes may be sequentially selected as major shareholder nodes starting with the node having the largest share value. Here, the major shareholder nodes may be nodes having shares, the sum of which is equal to or greater than a preset value. Here, the major shareholder nodes may be selected until the cumulative number of shares of the nodes selected as major shareholder nodes becomes equal to or greater than a certain proportion of all shares, or a predefined number of major shareholder nodes may be selected from the nodes having the largest share values.

In order to selectively process transactions, only the major shareholder nodes selected as described above are able to receive transactions to be processed. Here, the remaining nodes, excluding the major shareholder nodes, may serve merely to mediate transactions.

As described above, when major shareholder nodes for processing transactions are separately selected from among all nodes, only the major shareholder nodes, among all consensus nodes participating in distributed consensus, receive the transaction to be processed. Accordingly, the cost of traffic over the entire network may be reduced. Here, when a consensus congress is formed, the major shareholder nodes may use the transactions assigned thereto for distributed consensus.

FIG. 1 is a table illustrating the state of shares possessed by nodes, including major shareholder nodes, and transaction processing according to an embodiment of the present invention.

Referring to FIG. 1, it can be seen that the total number of nodes is 100, the total number of issued shares is 180, and the cumulative number of shares possessed by 10 top nodes is 90, which accounts for 50% of all of the shares.

Here, node 1, node 2, node 3, node 4, node 5, node 6, node 7, node 8, node 9, and node 10, which possess 50% of all of the shares, may be selected as major shareholder nodes. Here, only node 1, node 2, node 3, node 4, node 5, node 6, node 7, node 8, node 9, and node 10, which are the nodes selected as major shareholder nodes, may receive transactions to be processed, and the remaining nodes, namely node 11, node 12, . . . , node 99, and node 100, may serve merely to mediate transactions.

Hereinafter, a method for selecting consensus nodes for distributed consensus according to an embodiment of the present invention will be described.

Basically, selecting consensus nodes according to an embodiment of the present invention is performed by applying Equations (1) and (2) above based on shares.

When the sum of shares possessed by all participating nodes is n and when a Byzantine proportion is $b_p$, the maximum Byzantine shares are b ($=n \times b_p$), and p and f that satisfy both Equation (1) and Equation (2) above may be calculated.

That is, each of nodes forming a blockchain repeatedly performs a coin toss with a success probability of p a number of times equal to the share value thereof. After the results of all of the nodes are collected, when the sum of the shares corresponding to the success is equal to or greater than 3f+1, arbitrary nodes that possess 3f+1 shares are selected as consensus nodes (a consensus congress). Here, in order to prevent a specific node from having an excessive number of consensus shares (shares corresponding to the success in the coin toss), a method of admitting only shares up to an upper limit, among participatory shares, as valid shares may be applied.

Assuming that $b_p$, which is the tolerated Byzantine ratio, is 20% and that $P_{min\_node}=1.0e^{-6}$ and $P_{max\_bzt}=2.0e^{-16}$ are satisfied, because n, which is the total number of shares possessed by 100 nodes, is 180 in the example of FIG. 1, f and p satisfying both Equation (1) and Equation (2) are 36 and 0.7666666666666667, respectively.

Table 1 below shows, when the Byzantine ratio, $b_p$, is 20% and $P_{min\_node}=1.0e^{-6}$ and $P_{max\_bzt}=2.0e^{-16}$ are satisfied, the result of comparing the case in which f satisfying Equations (1) and (2) above is calculated based on shares according to an embodiment of the present invention with the case in which f and p satisfying Equations (1) and (2) above are calculated based on nodes according to the distributed consensus algorithm disclosed in the above-mentioned paper "Algorithm based on Byzantine agreement among decentralized agents (BADA)", U.S. Patent No. 2019-0327048, U.S. Patent No. 2019-0379538, and U.S. Patent No. 2020-0403776.

TABLE 1

| | n | 3f + 1 | 2f + 1 | f | p |
|---|---|---|---|---|---|
| NODE-BASED | 100 | 61 | 41 | 20 | 0.86 |
| SHARE-BASED | 180 | 109 | 73 | 36 | 0.767 |

In Table 1 above, in the case of the node-based method, n is the number of all nodes, 3f+1 is the number of consensus nodes corresponding to a consensus congress, 2f+1 is the number of quorum nodes corresponding to a consensus quorum, and f is the number of Byzantine nodes corresponding to the probability $P_{max\_bzt}$.

In Table 1 above, in the case of the share-based method, n is the total number of shares possessed by all nodes, 3f+1 is the number of consensus shares corresponding to a consensus congress, 2f+1 is the number of quorum shares corresponding to a consensus quorum, and f is the number of Byzantine shares corresponding to the probability $P_{max\_bzt}$.

That is, when a participating node repeatedly performs a coin toss with a success probability of p as many times as the share value possessed thereby, the total number of shares corresponding to the success follows a binomial distribution, and all of the nodes that win the coin toss one or more times become consensus candidate nodes. In other words, all of the nodes having a successful share become consensus candidate nodes.

In the example of Table 1, when the total number of shares, n, and the success probability, p, satisfying the conditions are considered, an average of about 138 shares (=n×p=180×0.767) corresponds to success in the coin toss. Accordingly, among the 138 successful shares, nodes having 109 (3f+1) successful shares (consensus shares) may be selected as consensus nodes corresponding to a consensus congress.

When 109 consensus shares are selected, if the successful shares of the major shareholder nodes are preferentially selected, an average of about 69 (=90×0.767) successful shares of the major shareholder nodes will be selected as consensus shares. Then, the 40 remaining consensus shares are randomly selected from among the successful shares of nodes from node 11 to node 100. The actually selected shares are determined depending on a probability distribution, but this example simply takes the average value in order to describe the concept.

If the selected 69 successful shares of the major shareholder nodes are distributed across the 10 major shareholder nodes of FIG. 1, the total number of consensus nodes having the consensus shares becomes 50 by adding the 10 major shareholder nodes and the remaining 40 nodes (because the remaining 40 nodes each have a share value of 1). This means that distributed consensus is possible with a smaller number of consensus nodes, compared to the case in which, when a consensus congress is selected based on nodes, 61 consensus nodes are required when 100 nodes participate, as shown in Table 1 above.

Also, in the distributed consensus algorithm of existing delegation methods, such as DPoS and the like, only nodes to which agreement authority is delegated (bp nodes in the case of EOS) participate in consensus, and the remaining nodes are not able to participate in the consensus. In contrast, in the consensus algorithm according to an embodiment of the present invention, because only 10 consensus nodes, among a total of 50 consensus nodes, are selected from major shareholder nodes, other nodes having one or more shares still have the possibility of participating in consensus. Accordingly, the consensus algorithm according to an embodiment of the present invention enables all nodes to be eligible to participate in consensus while separately arranging nodes for processing transactions, thereby maintaining decentralization.

FIG. 2 is a flowchart illustrating a distributed consensus method according to an embodiment of the present invention.

Referring to FIG. 2, in the distributed consensus method according to an embodiment of the present invention, each of nodes forming a blockchain performs an operation corresponding to a success probability of p a number of times corresponding to the share value thereof at step S210.

Here, the nodes forming the blockchain may include major shareholder nodes for processing transactions.

Here, the operation may be configured to compare a random value generated using the nonce chain of the node performing the operation with a threshold corresponding to the success probability.

Also, in the distributed consensus method according to an embodiment of the present invention, nodes having at least one share corresponding to the operation which is successful send messages for being selected as consensus nodes at step S220.

Also, in the distributed consensus method according to an embodiment of the present invention, nodes having consensus shares, which are selected from among the shares corresponding to the operation which is successful, perform distributed consensus as consensus nodes at step S230.

Here, shares corresponding to the operation which is successful, among the shares possessed by the major shareholder nodes, may have priority for being selected as consensus shares.

Here, the major shareholder nodes may have an upper limit on the number of consensus shares capable of being assigned thereto.

Here, the major shareholder nodes may be selected from among the nodes in descending order of shares possessed by the nodes.

Here, the major shareholder nodes may be selected until the cumulative number of shares of the nodes selected as the major shareholder nodes becomes equal to or greater than a preset proportion of all of the shares or until the number of nodes selected as major shareholder nodes becomes equal to or greater than a preset number.

Here, when selected as consensus nodes, the major shareholder nodes may send delegate request messages including transactions, and nodes, other than the major shareholder nodes, among the consensus nodes, may send delegate request messages not including any transactions.

Here, the nodes forming the blockchain have at least one additional share value along with the share value, and may process different kinds of services in parallel based on the share value and the additional share value.

Here, a nonce value corresponding to the nonce chain may be shared between the share value and the additional share value. When the nonce value is shared, if a hash related to the share of the previous block is used, a coin toss for two or more share values becomes possible.

Figure 3:
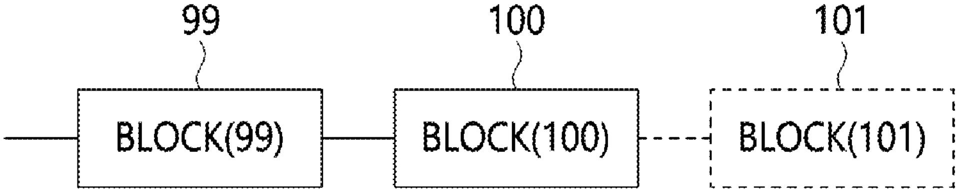
FIG. 3 is a block diagram illustrating an example in which a new block is agreed upon and added to a blockchain using a blockchain generation method according to an embodiment of the present invention.

FIG. 3 is a block diagram illustrating an example in which a new block is agreed upon and added to a blockchain using a method for generating a blockchain according to an embodiment of the present invention.

Referring to FIG. 3, it can be seen that, in the state in which the current block (block 100) is agreed upon and connected to a blockchain, when distributed consensus for block 101 is performed and succeeds, block 101 is connected to the blockchain.

Here, in the process for agreement on block 100, the results of a coin toss performed by nodes (that is, performed by each node a number of times equal to the share value thereof) are collected in order to decide on a consensus congress for block 101, and 50 nodes having 109 successful shares may be selected as a consensus congress (consensus nodes), as in the above-described example.

Figure 4:
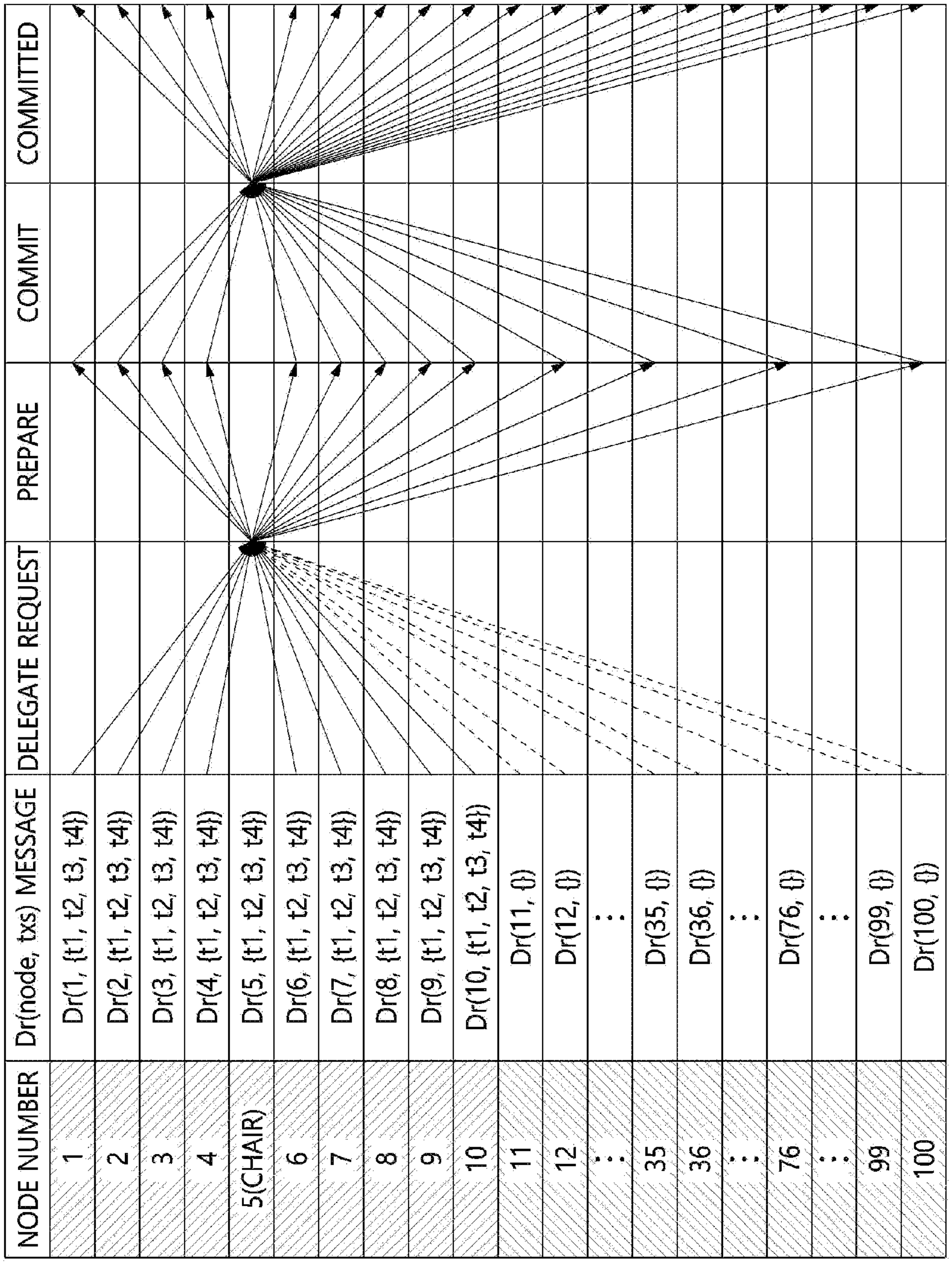
FIG. 4 is a table illustrating a blockchain generation method according to an embodiment of the present invention.

FIG. 4 is a table illustrating a method for generating a blockchain according to an embodiment of the present invention.

Referring to FIG. 4, it can be seen that, among consensus nodes, node 5 is a chair node for block 101 in the method for generating a blockchain according to an embodiment of the present invention.

The example of FIG. 4 corresponds to an embodiment of the present invention described with reference to FIGS. 1 to 3, and consensus nodes are 50 nodes having 109 successful shares and include major shareholder nodes, which are nodes from node 1 to node 10. Although not explicitly illustrated in FIG. 4, the consensus nodes include 40 nodes selected from among nodes from node 11 to node 100, other than the 10 major shareholder nodes.

In the example of FIG. 4, it is assumed that, when a consensus congress is formed, the successful shares of the nodes are disclosed.

After block 100 is agreed upon, transactions t1, t2, t3, and t4, which have not yet been processed, are transferred to the respective major shareholder nodes, whereby nodes from node 1 to node 10 are assigned the transactions t1, t2, t3 and t4.

At the delegate request stage for block 101, each of the consensus nodes sends a message, containing the transactions received thereby, to the chair node. Here, the format of the message may be Dr(node, {txs}), and additional information, such as a digital signature and the like, may be included in the message for integrity thereof. Hereinafter, only essential data, excluding the additional information, will be briefly described for convenience of description.

Nodes from node 1 to node 10, which are major shareholder nodes, among the consensus nodes, send Dr(node, {t1, t2, t3, t4}) messages, including the transactions {t1, t2, t3, t4}, to the chair node, as shown in FIG. 4. Here, 40 consensus nodes selected from among nodes from node 11 to node 100 have no transactions, and therefore send a message such as Dr(node, { }) to node 5, which is a chair node.

At the delegate request stage, when the sum of the successful shares of the nodes sending the delegate request messages (Dr( ) messages) is greater than 73 (2f+1), which is a quorum size, and when the sum of the successful shares corresponding to Dr( ) messages received from nodes from node 1 to node 10 is equal to or greater than 37 (f+1), node 5, which is a chair node, generates a prepare message, transfers the same to quorum nodes, and changes the state thereof to 'Prepare'. In the example of FIG. 4, the quorum nodes are a total of 14 nodes including the chair node (node 1, node 2, node 3, node 4, node 5, node 6, node 7, node 8, node 9, node 10, node 12, node 35, node 76, and node 100).

The prepare message generated by the chair node may include transactions, processing of which is requested by the nodes having 37 (f+1) or more successful shares, among the transactions {t1, t2, t3, t4} included in each of the received delegate request messages, along with additional information. Here, the additional information may be proof corresponding to the included transactions, data for a multi-signature, or the like. Consensus technology using multi-signature has been described in detail in the above-mentioned paper and patents.

As described above, when the major shareholder nodes, among the consensus nodes, repeatedly perform a coin toss a number of times equal to the respective share values thereof, the average number of times the coin toss is won is 69. As described above, because f is 36, a prepare message including transactions agreed upon by 37 successful shares (53.62%) will be generated by the chair node. In the example described with reference to FIG. 4, because the number of successful shares possessed by 10 nodes from node 1 to node 10, which made a request to process the transactions {t1, t2, t3, t4}, is 69 and because this value is equal to or greater than 37 (f+1), a prepare message, including the transactions t1, t2, t3, and t4 and proof for the successful shares of the nodes that made a request to process the respective transactions, is generated and sent to the quorum nodes.

For the performance of 10,000 Transactions Per Second (TPS), the transaction data load imposed on each node is 20 Mbit/s. Accordingly, nodes from node 1 to node 10 have to receive 10,000 transactions per second, check whether there is any abnormality therein, generate a Dr(node, {10,000 txs}) message including 10,000 transactions, and send the same to the chair node. In this case, the volume of traffic for transferring raw transactions from nine nodes, excluding the chair node, to the chair node is 180 Mbit/s. Here, if a transaction hash is used, the network cost may be reduced.

Because the 40 consensus nodes selected from among nodes from node 11 to node 100 neither receive nor store transactions, they transfer Dr(node,{ }) messages containing an empty transaction to the chair node. Accordingly, the network cost for transferring transactions is zero.

Furthermore, because the Dr(node, { }) messages received from the 40 nodes include no transactions, the computing load for processing transactions is reduced in the chair node.

In the case of the consensus algorithm introduced in the above-mentioned paper and patents, among 61 consensus nodes, 60 nodes, excluding the chair node, have to respectively send Dr(node, {10,000 txs}) messages, each containing 10,000 transactions, to the chair node, as shown in Table 1 above, in which case the traffic the chair node has to receive is 60×20 Mbit/s=1,200 Mbits/s, so it is impossible to process the same even with the network bandwidth of 1 Gb. Even if there is no limit on the network bandwidth, because all of the 60 messages include transactions, the chair node has no choice but to consume computing resources in order to process the same.

In the example of FIG. 4, the quorum nodes are 14 nodes (node 1, node 2, node 3, node 4, node 5, node 6, node 7, node 8, node 9, node 10, node 12, node 35, node 76, and node 100), which have 73 (2f+1) successful shares. In the case of the node-based method, 41 nodes have to constitute the quorum nodes, as shown in Table 1, but according to the present invention, the number of quorum nodes is decreased from 41 to 14, which has an effect of reducing the amount of computing resources and network resources required for the consensus process. Table 2 below shows the difference in the number of nodes between the node-based consensus algorithm and the share-based consensus algorithm.

TABLE 2

| | TOTAL NODES | CONSENSUS NODES | QUORUM NODES |
|---|---|---|---|
| NODE-BASED | 100 | 61 | 41 |
| SHARE-BASED | 100 | 50 | 14 |

Referring again to FIG. 4, among the consensus nodes, the quorum nodes receiving the prepare message change the states thereof to a prepare stage. Only the quorum nodes, the node state of which is a prepare stage, are able to generate a commit message. The quorum nodes, the node state of which is a prepare stage, check whether or not the received prepare message is normal, generate a commit message including the signature thereof when there is no abnormality, transfer the same to the chair node, and change the state thereof to 'commit'.

When the chair node in the 'prepare' state receives the commit messages from all of the quorum nodes, excluding the chair node itself, the chair node generates a committed block, including the transactions t1, t2, t3, and t4, which are finally agreed upon, and a multi-signature acquired by aggregating the signatures of the nodes, and adds the committed block as block 101 subsequent to block 100 in the blockchain thereof. Simultaneously therewith, the chair node propagates the block (block 101) that is agreed upon to all of the nodes and changes the state thereof to a committed state.

Also, all of the nodes that are not in the committed state for block 101 receive the committed block, check whether the multi-signature of the block is valid, add block 101 subsequent to block 100 of the blockchain thereof only when the multi-signature is valid, and change the state thereof to a committed state. All of the nodes that are in the committed state for block 101 become ready to agree on block 102.

Figure 5:
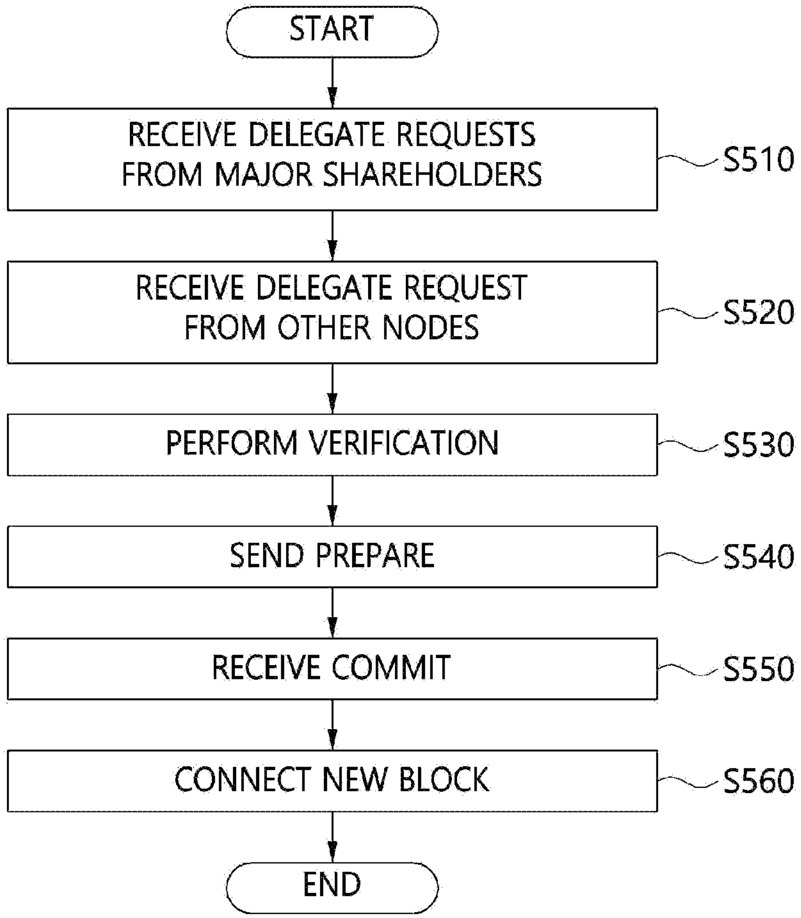
FIG. 5 is a flowchart illustrating a blockchain generation method according to an embodiment of the present invention.

FIG. 5 is a flowchart illustrating a method for generating a blockchain according to an embodiment of the present invention.

Referring to FIG. 5, in the method for generating a blockchain according to an embodiment of the present invention, a chair node, which is one of consensus nodes that are selected in order to connect an additional block to a blockchain, receives delegate request messages, including transactions that have to be processed after the previous block connected to the blockchain is agreed upon, from major shareholder nodes, among the consensus nodes, at step S510.

Here, the consensus nodes may be selected based on an operation corresponding to a success probability of p that is performed as many times as the share value of each of nodes forming the blockchain.

Here, the consensus nodes may be nodes having consensus shares that are selected from among shares corresponding to the operation which is successful.

Here, the major shareholder nodes may be selected from among the nodes in descending order of shares possessed thereby.

Here, the major shareholder nodes may have an upper limit on the number of consensus shares capable of being assigned thereto.

Also, in the method for generating a blockchain according to an embodiment of the present invention, the chair node receives delegate request messages including no transactions from the remaining nodes, excluding the major shareholder nodes, among the consensus nodes, at step S520.

Here, steps S510 and S520 may be performed according to the order in which the consensus nodes for sending the delegate request messages send the delegate request messages, rather than being sequentially performed in the order illustrated in FIG. 5. That is, steps S510 and 520 may be performed in the order illustrated in FIG. 5, in the reverse order, or at the same time.

Also, in the method for generating a blockchain according to an embodiment of the present invention, the chair node performs share-based verification using the delegate request messages including the transactions and the delegate request messages including no transactions at step S530.

Here, share-based verification may include checking whether the sum of successful shares corresponding to the delegate request messages including the transactions and the delegate request messages including no transactions is greater than a quorum size (2f+1). Here, a prepare message may include transactions for which the sum of successful shares is verified using a reference natural number (f+1), which corresponds to half the result of adding 1 to the quorum size.

When share-based verification succeeds, the chair node sends the prepare message to quorum nodes at step S540.

Also, in the method for generating a blockchain according to an embodiment of the present invention, the chair node receives commit messages from the quorum nodes at step S550.

Also, in the method for generating a blockchain according to an embodiment of the present invention, the chair node connects the additional block to the blockchain based on the commit messages at step S560.

Figure 6:
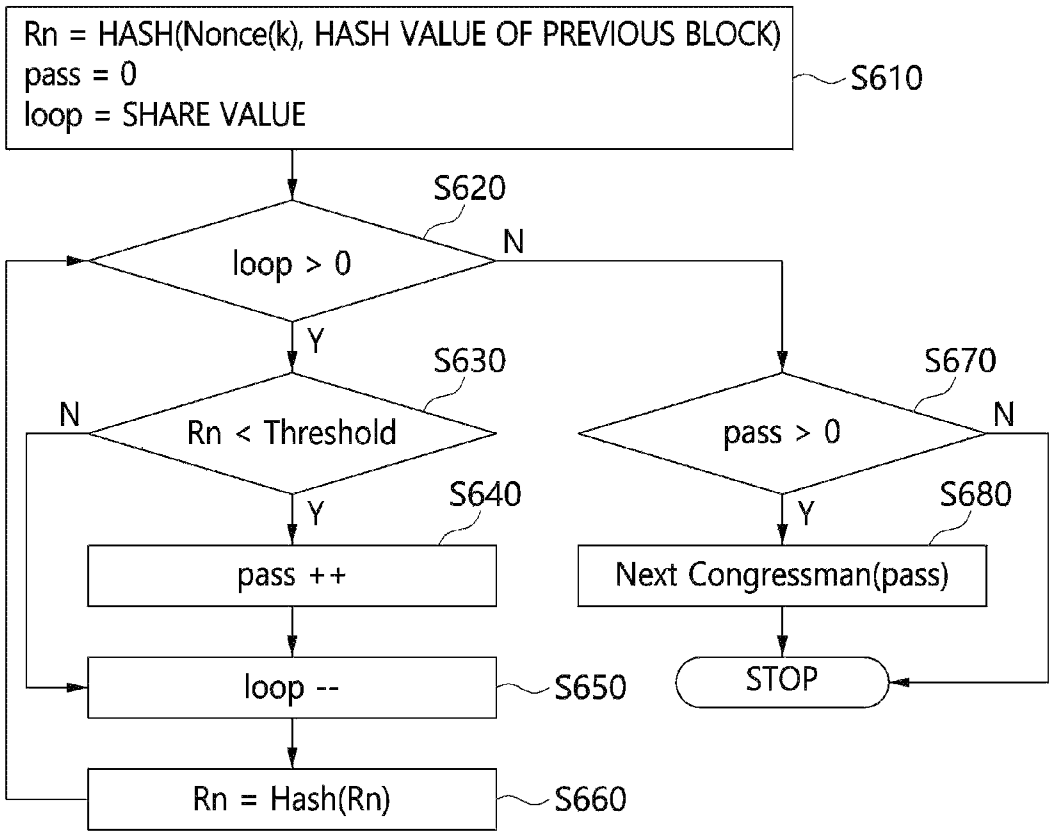
FIG. 6 is a flowchart illustrating a process in which each of nodes forming a blockchain performs an operation corresponding to a success probability a number of times corresponding to the share value thereof according to an embodiment of the present invention.

FIG. 6 is a flowchart illustrating a process in which each of nodes forming a blockchain performs an operation corresponding to a success probability a number of times equal to the share value thereof according to an embodiment of the present invention.

FIG. 6 illustrates technology in which each node is able to repeat a coin toss a number of times equal to the share value possessed thereby based on technology in which each node performs a coin toss once using a Verifiable Random Function (VRF) or a nonce chain described in the above-mentioned paper and patents.

Referring to FIG. 6, it can be seen that a random value Rn is generated first and variables 'pass' and 'loop' are initialized at step S610.

In the example illustrated in FIG. 6, 'Rn=Hash(Nonce(k), HASH VALUE OF PREVIOUS BLOCK)' is a process of generating a random value using a nonce chain, as described in detail in the above-mentioned paper and patents. Here, 'HASH VALUE OF PREVIOUS BLOCK' may be the header hash of the previous block. Also, 'loop=SHARE VALUE' indicates that the variable 'loop' is initialized to the share value of each node. The variable 'pass' is initialized to 0.

Whether the variable 'loop' is greater than 0 is determined at step S620.

When it is determined at step S620 that 'loop' is greater than 0, this indicates that there is a share with which a coin toss is capable of being performed, so the process goes to step S630, whereby an operation corresponding to the coin toss is performed at step S630.

Here, at step S630, whether the random value Rn is less than a threshold may be determined. The threshold is a value corresponding to p, which is set based on Equations (1) and (2) above, and may be calculated using p. For example, when the operation is performed on 32 bits, the product of p and a 32-bit value, all bits of which are 1, may be used as the threshold.

When it is determined at step S630 that Rn is less than the threshold, this is considered success in the coin toss, and the process goes to step S640, whereby the variable 'pass' is increased by 1.

Then, the variable 'loop' is decreased by 1 at step S650.

When it is determined at step S630 that Rn is not less than the threshold, this is considered failure in the coin toss, so the process goes to step S650 without increasing the variable 'pass'.

Then, the current value of Rn is hashed, whereby the random value Rn is updated at step S660.

After the random value is updated, step S620 is performed again.

When it is determined at step S620 that 'loop' is not greater than 0, step S670 is performed, whereby whether the variable 'pass' is greater than 0 is checked.

When it is determined at step S670 that the variable 'pass' is greater than 0, a 'Next Congressman' message is output, whereby the node announces that the node itself is eligible to become a consensus congress candidate for the next block at step S680.

Here, because the 'Next Congressman' message includes the calculated value of 'pass', the nodes receiving the 'Next Congressman' message are made aware of the number of times the node sending the 'Next Congressman' message won the coin toss.

When it is determined at step S670 that the variable 'pass' is not greater than 0, the operation is terminated.

Other nodes receiving the 'Next Congressman' message may check whether there is any abnormality by again performing the steps illustrated in FIG. 6.

FIG. 7 is a table illustrating an example of the case in which nodes forming a blockchain have different types of share values according to an embodiment of the present invention.

Referring to FIG. 7, it can be seen that each node has multiple different share values (share value 1 and share value 2).

As such, when each of participating nodes includes multiple different share values, the participating nodes may process two or more different agreements in parallel.

With regard to share value 1, consensus may be performed whereby nodes from node 1 to node 10 constitute major shareholder nodes, and with regard to share value 2, consensus may be performed whereby nodes from node 11 to node 20 constitute major shareholder nodes. Accordingly, the share values (share value 1 and share value 2) may be used to respectively connect new blocks to different blockchains.

When multiple share values are used as described above, even when there is a large number of nodes, different services may be processed without requiring splitting into shards.

When multiple share values are used, if provable random values are separately generated for the respective share values, management and operation may become difficult. In this case, when Rn in FIG. 6 is generated for each share value, if each node generates only one nonce(k) and uses different share-related hash values of the previous block for the respective share values possessed thereby, a coin toss for two or more share values may be performed using only a single nonce(k).

Figure 8:
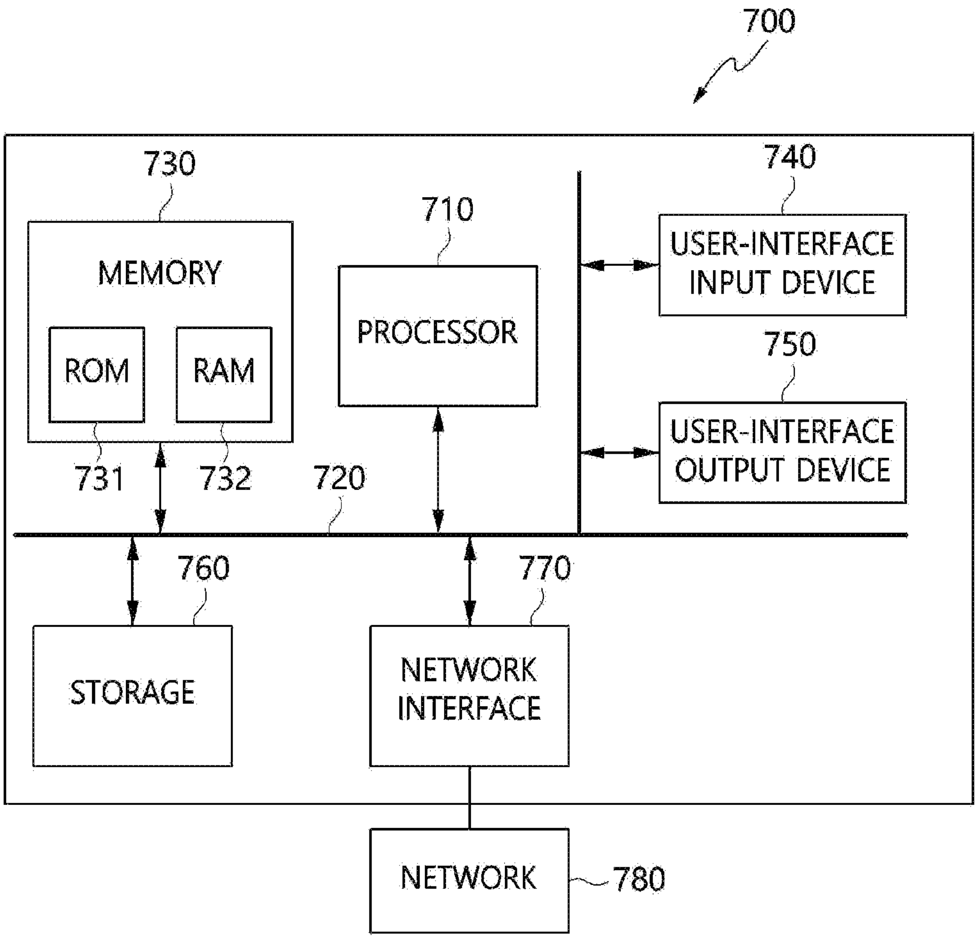
FIG. 8 is a block diagram illustrating a computer system configuration according to an embodiment of the present invention.

FIG. 8 is a block diagram illustrating a computer system configuration according to an embodiment of the present invention.

The distributed consensus apparatus, the blockchain generation apparatus, and the nodes forming a blockchain according to an embodiment may be implemented in a computer system 700 including a computer-readable recording medium.

The computer system 700 may include one or more processors 710, memory 730, a user-interface input device 740, a user-interface output device 750, and storage 760, which communicate with each other via a bus 720. Also, the computer system 700 may further include a network interface 770 connected to a network 780. The processor 710 may be a central processing unit or a semiconductor device for executing a program or processing instructions stored in the memory 730 or the storage 760. The memory 730 and the storage 760 may be storage media including at least one of a volatile medium, a nonvolatile medium, a detachable medium, a non-detachable medium, a communication medium, or an information delivery medium, or a combination thereof. For example, the memory 730 may include ROM 731 or RAM 732.

Here, at least one program may be recorded in the memory 730.

Here, the processor 710 may execute the program. Here, the program may perform an operation corresponding to a success probability (p) a number of times corresponding to the share value of each of the nodes forming a blockchain, send a message for selecting nodes having at least one share corresponding to the operation which is successful as consensus nodes, and perform distributed consensus by using the nodes having consensus shares, selected from among the shares corresponding to the operation which is successful, as the consensus nodes.

Here, the nodes forming the blockchain may include major shareholder nodes for transaction processing.

Here, when selected as the consensus nodes, the major shareholder nodes may send a delegate request message including transactions, and nodes other than the major shareholder nodes, among the consensus nodes, may send a delegate request message including no transactions.

Here, the shares corresponding to the operation which is successful, among the shares possessed by the major shareholder nodes, may have priority for being selected as consensus shares.

Here, the major shareholder nodes may have an upper limit on the number of consensus shares capable of being assigned thereto.

Here, the major shareholder nodes may be selected from among the nodes in descending order of shares possessed thereby.

As shown in the example of FIG. 1, the share-based distributed consensus method according to an embodiment of the present invention has an effect of reducing the number of nodes that receive transactions to 1/10 of the original number. Also, as shown in Table 2, when n is set to the number of shares, the size of a consensus congress is reduced to 50, compared to the case in which the size is 61 when n is set to the number of nodes. Furthermore, when n is set to the number of nodes, a quorum size is 41, but when n is set to the number of shares, the quorum size is reduced to 14, whereby message complexity and the amount of traffic required for consensus are significantly reduced.

In addition, when each node has two or more different share values, as in the example of FIG. 7, difference services may be processed in parallel in a single blockchain. In the conventional method, a physical split into shards is required for such a parallel-processing effect, but according to the present invention, parallel processing is possible without performing splitting into groups.

Hereinafter, technology in which, without partitioning into shards in each epoch, additional chains are added to a blockchain and parallel processing is performed through the respective chains will be described in detail.

Because a general blockchain system is configured such that all nodes are eligible to generate a new block, it is necessary to transfer transactions that have to be processed to all of the nodes. In this case, because all of the nodes in the blockchain have to repeat the same processing in order to process the transactions, it is difficult to expect processing performance improvement despite an increase in the number of nodes. When sharding, by which transactions assigned to each shard are individually processed, is applied in order to solve this problem, transactions are distributed across shards and processed in parallel, whereby the performance of the entire blockchain is improved.

In order to operate shards, appropriately assigning nodes to respective shards is repeated for each epoch, whereby centralization is prevented. Here, a shard may correspond to a set of one or more nodes participating in a blockchain. However, when nodes are reassigned in each epoch, it is not allowed to add a shard in the middle of the epoch, and one node is not allowed to simultaneously participate in two or more shards. Generally, an increase in the number of nodes participating in consensus has positive effects in the characteristics of a blockchain, such as security or the like, but when the nodes are distributed across shards, the number of nodes participating in consensus is decreased.

In Ethereum, in order to accommodate Proof-of-Stake (PoS), accounts depositing 32 Ether (ETH) are qualified as validators and consensus is performed by voting by the validators. When two or more shards are presents, the validators are randomly assigned thereto.

According to the method and apparatus for distributed consensus and the method for generating a blockchain, which are described above with reference to FIGS. 1 to 7, a node participating in a blockchain may acquire a voting right (a share value) using the asset possessed thereby. Here, the exchange ratio between the asset and the share value may be 1:1 or 1:K (K being a positive real number).

For example, a specific node participating in a blockchain may deposit an asset of 100 for shares of a specific chain after withdrawing the same from its balance, and when the exchange ratio between the asset and the share value is 1:1, the node may acquire a share value of 100. Here, the share value may correspond to a voting right, as described above.

FIG. 9 is a table illustrating an example of assets possessed by nodes participating in a blockchain.

Referring to FIG. 9, users A, B, C, D, E, F, G, H, I, J, and K have assets in their accounts, and it can be seen that some of the users deposit their assets for additional blockchains (the 10th blockchain and the 15th blockchain). Hereinafter, the case in which the exchange ratio between an asset and a share value is 1:1 is illustrated for convenience of description.

According to an embodiment of the present disclosure, a new additional chain may be initiated by a consensus congress configured with only major shareholder nodes. Also, in order to control the maximum number of nodes that can participate in the newly generated additional chain, a new node can be added in the corresponding chain only when the sum of all of the share values possessed by minor shareholder nodes is equal to or less than the sum of the share values possessed by the major shareholder nodes.

Here, in a specific chain, the minor shareholder nodes may be all other nodes excluding the major shareholder nodes described above through the examples of FIGS. 1 to 8.

In the example illustrated in FIG. 9, nodes C, F, and G each deposit an asset of 10 in order to add an additional chain (the 10th chain), and become the major shareholder nodes of the 10th chain such that consensus is started in the 10th chain. Here, because the sum of the share values possessed by the major shareholder nodes of the 10th chain is 30, addition of nodes is allowed only when the sum of the share values of the remaining nodes capable of being added in the 10th chain is equal to or less than 30.

As described above, when a maximum number of nodes allowed in a single chain participate in the corresponding chain, an increase in the sum of the share values of the major shareholder nodes (a first total share value) is required in order to add more nodes in the corresponding chain, in which case the sum of the share values of the major shareholder nodes may be increased through an expansion process. Here, the expansion process may be any one of a first process, a second process, and a third process, and this will be described in detail later.

In the example illustrated in FIG. 9, when the number of minor shareholder nodes participating in the 10th chain is less than 30, the result of voting can be always decided by the major shareholder nodes, and in order to prevent this, the number of votes of the major shareholder nodes to be actually applied may be limited. For example, when six minor shareholder nodes participate in the 10th chain, the maximum number of voting rights (share value) of each of the major shareholder nodes C, F, and G are limited to 2 instead of 10, whereby the sum of the share values of the major shareholder nodes and the sum of the share values of the minor shareholder nodes may be maintained at a constant ratio. In this case, the votes of the major shareholder nodes may be prevented from unduly affecting a consensus result.

The technology described through the example of FIG. 9 may be used for the case in which, when a new chain is generated for provision of a new service, the service is tested by making only a small number of nodes participate in the new chain, and the number of nodes participating in the chain is increased when the service becomes popular. Here, the method or conditions for configuring initial major shareholder nodes for the new chain may be determined through a smart contract, or the like.

Here, not only major shareholder nodes but also minor shareholder nodes are allowed to participate in a consensus congress by depositing a minimum asset of 1, whereby indiscriminate participation or attacks may be prevented. Here, the exchange ratio between an asset and a share value for major shareholder nodes may differ from the exchange ratio between an asset and a share value for minor shareholder nodes.

Here, when the consensus algorithm described with reference to FIG. 4 and FIG. 5 is used, consensus becomes possible even when only the major shareholder nodes receive the transactions to be processed. Here, when the nodes are not allowed to simultaneously become major shareholder nodes in two chains as in the example of FIG. 9, major shareholder nodes are divided for the respective chains, whereby the transactions to be processed may be separately processed. For example, in the example of FIG. 9, the major shareholder nodes C, F, and G of the 10th chain are separate from the major shareholder nodes A, B, D, and E of the 15th chain, and the transactions to be processed by the major shareholder nodes C, F, and G of the 10th chain may be processed separately from the transactions to be processed by the major shareholder nodes A, B, D, and E of the 15th chain. Here, the minor shareholder nodes may participate both in the 10th chain and in the 15th chain, but may not receive the transactions.

In the example of FIG. 9, after the 10th chain is started, the 15th chain may be newly generated. Here, the four nodes A, B, D, and E may become major shareholder nodes by depositing their assets corresponding to the exchange ratio for the 15th chain. In the example of FIG. 9, each of the four nodes A, B, D, and E deposits an asset of 300 and acquires a share value of 300 (the exchange ratio being 1:1), thereby becoming a major shareholder node. In this case, a maximum of 1200 nodes may be allowed to participate in the 15th chain as minor shareholder nodes.

FIG. 10 is a table illustrating an example of participating node information of nodes participating in the 10th chain in the example illustrated in FIG. 9.

Referring to FIG. 10, the participating node information of nodes participating in the 10th chain may include the identifiers of the nodes participating in the 10th chain, the share values possessed by the respective participating nodes, and information about whether the corresponding node is a major shareholder node or a minor shareholder node (major/minor).

The participating node information illustrated in FIG. 10 may be considered a data structure showing the characteristics of the nodes participating in the 10th chain, and may be open to all of the nodes.

In the state corresponding to the example of FIG. 10, when a new node intends to participate in the 10th chain, the node may be added only when the following condition is satisfied.

<Condition for Adding a Node> the sum of the share values of major shareholder nodes*application ratio>=the sum of the share values of minor shareholder nodes+the share value of a new node Here, the application ratio is a real number greater than 0, and may be equal to or less than 1. For example, the application ratio may be 1.

When the number of nodes participating in a specific chain reaches the allowable maximum number, an expansion process for increasing the number of participating nodes may be performed. Here, the expansion process may be any one of a first process for increasing a share value corresponding to any one or more of the major shareholder nodes, a second process for adding a new major shareholder node, and a third process for changing at least one of the minor shareholder nodes to a major shareholder node.

The first process is to increase the number of participating nodes by increasing the share value of at least one of the existing major shareholder nodes without increasing the number of major shareholder nodes. For example, when the sum of the share values of the minor shareholder nodes participating in the 10th chain (a second total share value) becomes 31, each of the nodes C, F, and G increases its share value by 1 or more, thereby enabling more nodes to participate in the chain.

The second process is to increase the number of nodes that can be accommodated by a chain by adding an additional node having a share value similar to the share values of existing major shareholder nodes in the chain as a new major shareholder node. For example, when the sum of the share values of the minor shareholder nodes participating in the 10th chain (the second total share value) becomes 31, an arbitrary new node X may become a new major shareholder node of the 10th chain using its share value of 10.

The third process is to increase the number of nodes that can participate in a chain by promoting the node having the largest share value, among the minor shareholder nodes, to a major shareholder node when the number of participating nodes reaches the maximum number. For example, when the sum of the share values of the minor shareholder nodes participating in the 10th chain (the second total share value) becomes 31 at block 202 illustrated in FIG. 12, because user I has the largest share value, 2, among the minor shareholder nodes, user I is promoted to a major shareholder node. Here, the promotion result may be recorded in block 103 illustrated in FIG. 12 (the block of a main branch corresponding to the time of generation of block 202).

Figures 11, 12:
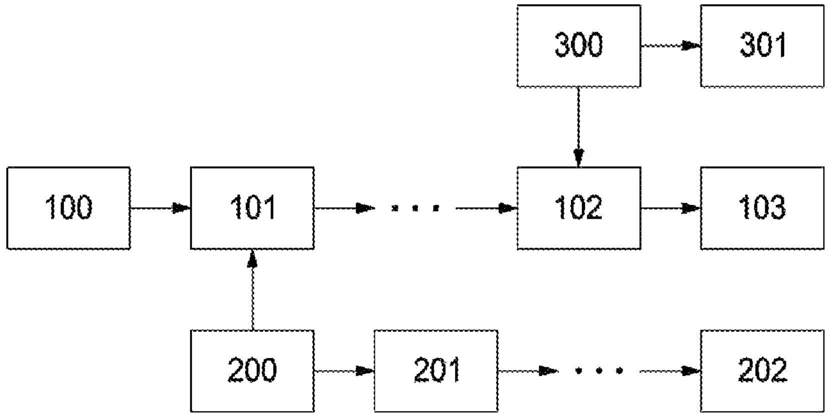
FIG. 11 is a table illustrating an example of participating node information of nodes participating in the 15th chain in the example illustrated in FIG. 9.
FIG. 12 is a block diagram illustrating an example of application of additional chains to a blockchain.

FIG. 11 is a table illustrating an example of participating node information of nodes participating in the 15th chain in the example illustrated in FIG. 9.

Referring to FIG. 11, the participating node information of nodes participating in the 15th chain may include the identifiers of the nodes participating in the 15th chain, the share values possessed by the respective participating nodes, and information about whether the corresponding node is a major shareholder node or a minor shareholder node (major/minor).

The participating node information illustrated in FIG. 11 may be considered a data structure showing the characteristics of the nodes participating in the 15th chain, and may be open to all of the nodes of the blockchain.

Although not explicitly illustrated in FIG. 10 or FIG. 11, the participating node information may include information about the asset deposited by each of the participating nodes.

As in the example described with reference to FIGS. 9 to 11, it may be impossible for a single node to simultaneously become a major shareholder node of the 10th chain and a major shareholder node of the 15th chain. However, it may be possible for a single node to participate in two or more chains as a minor shareholder node.

FIG. 12 is a block diagram illustrating an example in which additional chains are applied to a blockchain (an existing chain).

Referring to FIG. 12, blocks 100 to 103 correspond to a blockchain (existing chain) for recording information about generation of new chains, and it may be assumed that the existing chain corresponding to blocks 100 to 103 is in the state in which blocks can be connected thereto normally through consensus of participating nodes.

Here, in order to newly generate a 10th chain (additional chain), each of nodes C, F, and G may participate in the 10th chain with a share value of 10. Here, the participating node information of FIG. 10 is recorded in block 101 in FIG. 12, and the 10th chain may start with a block number 200. Here, the header hash value of a previous block that is recorded in the block header of block 200 may be set to the header hash value of block 101.

Subsequently, in order to newly generate a 15th chain (additional chain), the participating node information (FIG. 11) of nodes A, B, D, and E, which are major shareholder nodes that launch the additional chain, may be recorded in block 102. As described above, the participating node information may include the identifier and the share value of each of the nodes participating in the 15th chain and information about whether the node is a major shareholder node or a minor shareholder node. Here, the 15th chain may start with block 300 illustrated in FIG. 12. Here, the header hash value of block 102 is recorded in the header of block 300, and it seems like a branch is newly generated in the existing chain. This structure may have a tree structure with an increase in the number of additional chains.

Here, blocks 100, 101, . . . , 103 corresponding to the existing chain, blocks 200, 201, . . . , 202 corresponding to the 10th chain (which is the additional chain), and blocks 300 and 301 corresponding to the 15th chain (which is the additional chain) may perform distributed consensus using the consensus algorithm described with reference to FIGS. 1 to 8. Here, the consensus congress of the existing chain, the consensus congress of the 10th chain (the additional chain), and the consensus congress of the 15th chain (the additional chain) differ from each other, and consensus by each consensus congress may be performed individually.

That is, in the example illustrated in FIG. 12, the 10th chain and the 15th chain are added using the chain (including blocks 100 to 103) for recording information about the generation of new chains, and blocks may be generated.

The addition of additional chains described with reference to FIGS. 9 to 12 may performed based on consensus using another algorithm that differs from the consensus algorithm described with reference to FIGS. 1 to 8.

For example, additional chains may be added using a Practical Byzantine Fault Tolerance (PBFT) consensus algorithm. Here, when a chair node of a consensus congress has the transactions that have to be processed, consensus may be performed by proposing a block containing all of the transactions possessed by the chair node as a candidate block, whereas when the chair node of the consensus congress does not have the transactions that have to be processed, consensus may be performed by proposing a candidate block having no transaction. The consensus based on the candidate block having no transaction may be quickly performed because a consensus message size is very small.

Further, when the chair node of the consensus congress does not have the transactions that have to be processed, the chair node may receive the transactions from another node (other nodes) before it proposes a candidate block. Here, the chair node of the consensus congress may perform distributed consensus using a candidate block including the acquired transactions.

Figure 13:
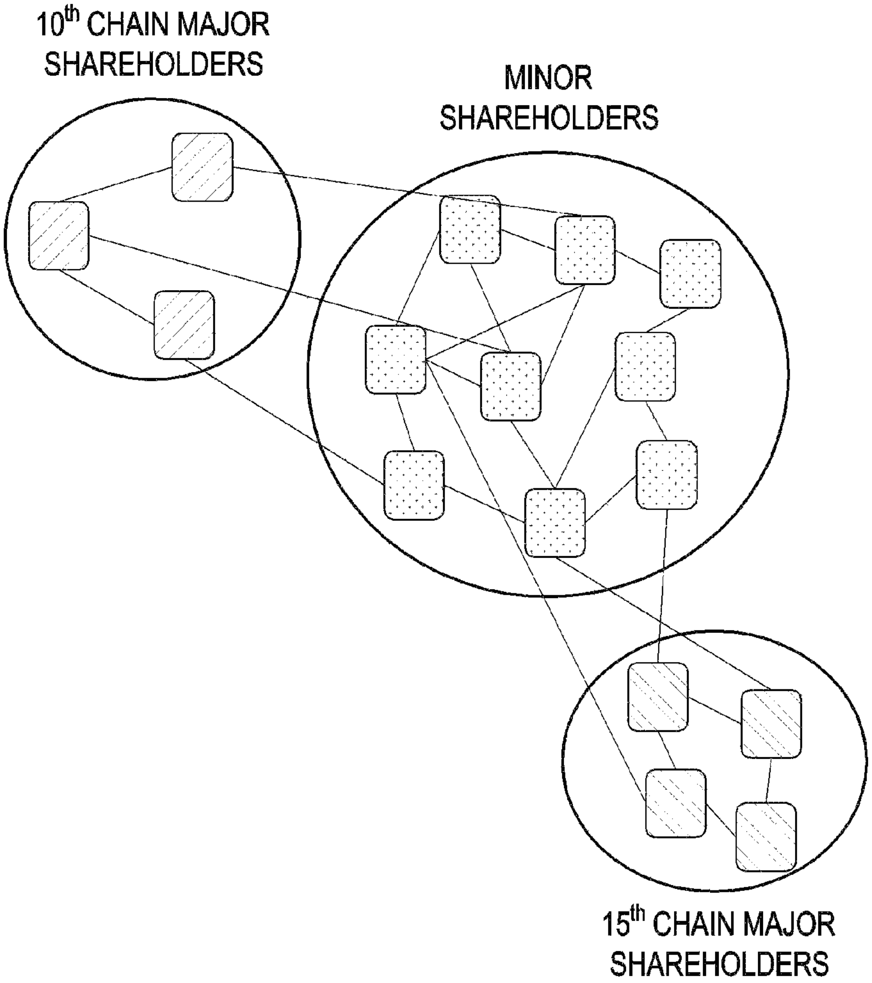
FIG. 13 is a view illustrating an example in which a 10th chain and a 15th chain share minor shareholder nodes.

FIG. 13 is a view illustrating an example in which the 10th chain and the 15th chain share minor shareholder nodes.

Referring to FIG. 13, it can be seen that major shareholder nodes are not allowed to simultaneously participate in two or more chains (shards) because they have to receive transactions to be processed for each chain (shard) and process the same, but the remaining minor shareholder nodes are able to simultaneously participate in two or more chains.

Figure 14:
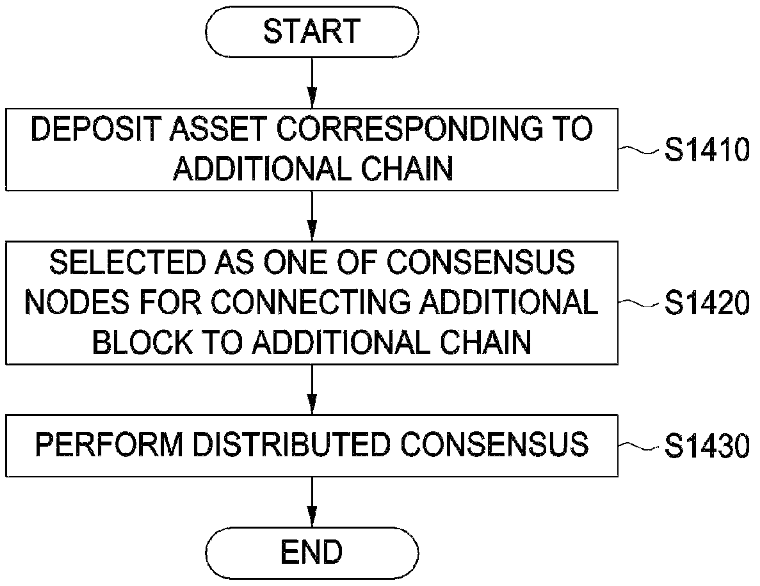
FIG. 14 is a flowchart illustrating a method for adding a new chain to a blockchain according to an embodiment of the present disclosure.

FIG. 14 is a flowchart illustrating a method for adding a new chain to a blockchain according to an embodiment of the present disclosure.

Referring to FIG. 14, in the method for adding a new chain to a blockchain according to an embodiment of the present disclosure, a node of a blockchain deposits an asset corresponding to an additional chain at step S1410.

Also, in the method for adding a new chain to a blockchain according to an embodiment of the present disclosure, the node is selected as one of consensus nodes for connecting an additional block to the additional chain based on the share value corresponding to the asset at step S1420.

Here, the consensus nodes may include at least one major shareholder node, and may include at least one minor shareholder node.

Here, the consensus nodes may include only major shareholder nodes at first.

Here, the node may perform steps S210 and S220 illustrated in FIG. 2 for step S1420.

Also, in the method for adding a new chain to a blockchain according to an embodiment of the present disclosure, the node performs distributed consensus for connecting the additional block at step S1430.

Here, nodes participating in the additional chain may include major shareholder nodes for processing transactions.

Here, the nodes participating in the additional chain may include minor shareholder nodes other than the major shareholder nodes, and no transactions may be transferred to the minor shareholder nodes.

Here, whether a new node is allowed to participate in the additional chain may be determined based on a first total share value corresponding to the major shareholder nodes and a second total share value corresponding to the minor shareholder nodes.

Here, whether a new node is allowed to participate may be determined based on a result of comparing the first total share value with the sum of the second total share value and the share value of the new node.

Here, the first total share value may be increased by an expansion process for enabling the new node to participate in the additional chain.

Here, the expansion process may be any one of a first process for increasing a share value corresponding to any one or more of the major shareholder nodes, a second process for adding a new major shareholder node, and a third process for changing at least one of the minor shareholder nodes to a major shareholder node.

Here, data on the additional chain may be recorded in a block of the blockchain.

Here, the data on the additional chain may include participating node information of the nodes participating in the additional chain and the share values of the nodes participating in the additional chain.

Here, the data on the additional chain may include start information of the additional chain, and the start block of the additional chain may record information about at least one block of the blockchain that records the data on the additional chain. Here, the start information of the additional chain may correspond to the participating node information at the time at which the additional chain is started.

Here, at least one of the minor shareholder nodes may participate in a chain other than the additional chain as a minor shareholder node.

Here, the major shareholder nodes may not be allowed to participate in a chain other than the additional chain as major shareholder nodes.

Figure 15:
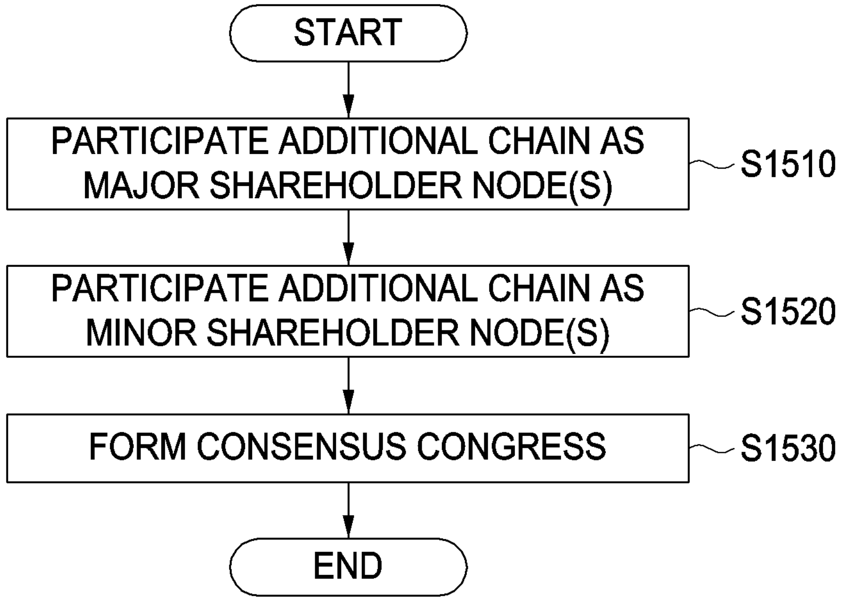
FIG. 15 is a flowchart illustrating a method for generating a shard in a blockchain according to an embodiment of the present disclosure.

FIG. 15 is a flowchart illustrating a method for generating a shard of a blockchain according to an embodiment of the present disclosure.

Referring to FIG. 15, the method for generating a shard of a blockchain according to an embodiment of the present disclosure comprises participating in an additional chain as a major shareholder node at step S1510.

Here, step S1510 may be performed by a node of the blockchain.

Here, the major shareholder node may be for processing a transaction.

Also, the method for generating a shard of a blockchain according to an embodiment of the present disclosure comprises participating in the additional chain as a minor shareholder node at step S1520.

Here, step S1520 may be performed by a node of the blockchain, and the node performing step S1520 may differ from the node performing step S1510.

Here, no transaction may be transferred to the minor shareholder node.

Also, the method for generating a shard of a blockchain according to an embodiment of the present disclosure comprises forming a consensus congress including any one or more of the major shareholder node, or the minor shareholder node, or a combination thereof at step S1530.

Here, the method of forming the consensus congress at step S1530 may follow the consensus algorithm described with reference to FIGS. 1 to 8 or a consensus algorithm such as a PBFT algorithm or the like, which differs from the consensus algorithm described with reference to FIGS. 1 to 8.

The shard described above may correspond to a set of nodes constituting a blockchain, and each shard may correspond to each chain.

Also, the apparatus for adding an additional chain to a blockchain and the apparatus for generating a shard of a blockchain according to an embodiment of the present disclosure may be implemented using hardware illustrated in FIG. 8.

That is, a program recorded in the memory 730 and executed by the processor 710 may deposit an asset corresponding to the additional chain to be added to a blockchain, may be selected as one of consensus nodes for connecting an additional block to the additional chain based on a share value corresponding to the asset, and may perform distributed consensus for connecting the additional block.

Here, nodes participating in the additional chain may include major shareholder nodes for processing transactions.

Here, the nodes participating in the additional chain may include minor shareholder nodes other than the major shareholder nodes, and no transaction may be transferred to the minor shareholder nodes.

Here, whether a new node is allowed to participate in the additional chain may be determined based on a first total share value corresponding to the major shareholder nodes and a second total share value corresponding to the minor shareholder nodes.

Here, at least one of the minor shareholder nodes may participate in a chain other than the additional chain as a minor shareholder node.

Here, the major shareholder nodes may not be allowed to participate in a chain other than the additional chain as major shareholder nodes.

Also, the program recorded in the memory 730 and executed by the processor 710 may participate in an additional chain as a major shareholder node, participate in the additional chain as a minor shareholder node, and form a consensus congress including any one or more of the major shareholder node, or the minor shareholder node, or a combination thereof.

According to an embodiment of the present disclosure, nodes become major shareholder nodes of an additional chain using share values associated with assets in an operational blockchain, whereby the additional chain may be immediately added.

Here, the additional chain may be launched by only the major shareholder nodes.

Subsequently, when a new node intends to participate in the additional chain, the new node is allowed to participate in the additional chain only when the sum of the share value possessed by the new node and the sum of the share values possessed by the minor shareholder nodes of the additional chain (a second total share value) is equal to or less than a certain proportion of the sum of the share values possessed by the major shareholder nodes of the additional chain (a first total share value).

Here, in order to enable a greater number of nodes to participate in the additional chain, the first total share value may be increased by an expansion process, and the expansion process may be any one of a first process for increasing a share value corresponding to any one or more of the major shareholder nodes, a second process for adding a new major shareholder node, and a third process for changing at least one of the minor shareholder nodes to a major shareholder node.

Here, in order to add a new additional chain to the operational blockchain, data on the major shareholder nodes of the new additional chain (share values, whether the node is a major shareholder node or a minor shareholder node, and the like) may be recorded in a specific block of the existing chain.

Subsequently, the existing chain may be updated with changes in the operational additional chain (major shareholder nodes, minor shareholder nodes, the share values of the nodes, and the like). Here, the block of the exiting chain in which the changes in the additional chain are recorded may be a block corresponding to the time at which the additional chain is changed.

As described above, when one node is prevented from becoming a major shareholder node of different chains, nodes for processing transactions in each chain are isolated, whereby the overall processing performance may be improved. Here, because one node is able to simultaneously become a minor shareholder node of different chains, the node is able to participate in consensus processes performed in the multiple chains.

Here, the start block of the new chain may record information about the block of the existing chain in which the start information of the new chain is recorded. Accordingly, the new chain may be generated like a new branch of the existing chain, and additional chains may be generated in a tree structure.

The method and apparatus for adding an additional chain to a blockchain and the method and apparatus for generating a shard of a blockchain for the same according to an embodiment of the present disclosure enable an additional chain to be added in real time during the operation of a blockchain. In the existing blockchain sharding technology, nodes have to be divided and assigned to respective shards, and they are not allowed to simultaneously participate in consensus congresses of different chains, so it is impossible to add a chain in real time.

Also, according to an embodiment of the present disclosure, the number of participating nodes may be adjusted by the sum of the share values possessed by major shareholder nodes (a first total share value). When a new business is started in a new chain, this enables adjustment of the maximum number of participating nodes according to need after testing the new business with a small number of participating nodes.

Also, according to an embodiment of the present disclosure, one node is prevented from simultaneously participating in two or more chains as a major shareholder node. Accordingly, the nodes to receive transactions and process the same may be separate for each chain, whereby redundant traffic may be minimized even when additional chains are dynamically added to a blockchain.

According to the present disclosure, a new chain may be added any time during the operation of a blockchain.

Also, the present disclosure may control the number of participating nodes using the share values of major shareholder nodes, and when it is intended to launch a new business in a new chain, this may be useful for gradually increasing the number of participating nodes after the new business is tested with a small number of participating nodes.

Also, according to the present disclosure, when one node is controlled not to be eligible for a major shareholder node in two or more chains, nodes to receive and process transactions may be separated for respective chains. Accordingly, even when a chain is dynamically added, redundant traffic may be reduced.

Also, according to the present disclosure, major shareholder nodes of multiple chains are separate for the respective chains (shards), but the remaining minor shareholder nodes are allowed to simultaneously participate in two or more chains, whereby efficient operation of the multiple chains may be achieved.

As described above, the method and apparatus for adding an additional chain to a blockchain and the method and apparatus for generating a shard of a blockchain for the same according to the present disclosure are not limitedly applied to the configurations and operations of the above-described embodiments, but all or some of the embodiments may be selectively combined and configured, so the embodiments may be modified in various ways.

What is claimed is:

1. A method for adding an additional chain to a blockchain, the method comprising:
depositing, by a node of the blockchain, a new asset corresponding to the additional chain, the node having an old asset corresponding to the blockchain;
selecting the node as one of consensus nodes for connecting an additional block to the additional chain based on a share value corresponding to the new asset; and
performing, by the node, distributed consensus for connecting the additional block,
wherein nodes participating in the additional chain include major shareholder nodes for processing transactions,
wherein the nodes participating in the additional chain include minor shareholder nodes other than the major shareholder nodes, and no transactions are transferred to the minor shareholder nodes,
wherein the node selected as one of the consensus nodes is selected based on an operation corresponding to a success probability of p, the operation performed as many times as the share value corresponding to the new asset,
wherein the major shareholder nodes correspond to at least one first share value and the minor shareholder nodes correspond to at least one second share value, the first share value being larger than the second share value,
wherein whether a new node is allowed to participate in the additional chain is determined based on a first total share value corresponding to the major shareholder nodes and a second total share value corresponding to the minor shareholder nodes,
wherein whether the new node is allowed to participate is determined based on a result of comparing the first total share value with a sum of the second total share value and a share value of the new node,
wherein the new asset and the old asset are of a same type and each of the new asset and the old asset is a respective portion of a total balance of each node, and
wherein the new asset is used to determine the consensus nodes of the additional chain and the old asset is used to determine consensus nodes of the blockchain.

2. The method of claim 1, wherein the consensus nodes include at least one major shareholder node and at least one minor shareholder node.

3. The method of claim 1, wherein the consensus nodes include only the major shareholder nodes at first.

4. The method of claim 1, wherein the first total share value is increased by an expansion process for enabling the new node to participate in the additional chain.

5. The method of claim 4, wherein the expansion process is any one of a first process for increasing a share value corresponding to any one or more of the major shareholder nodes, a second process for adding a new major shareholder node, and a third process for changing at least one of the minor shareholder nodes to a major shareholder node.

6. The method of claim 1, wherein data on the additional chain is recorded in a block of the blockchain.

7. The method of claim 6, wherein the data on the additional chain includes participating node information of the nodes participating in the additional chain and share values of the nodes participating in the additional chain.

8. The method of claim 7, wherein the data on the additional chain includes start information of the additional chain, and a start block of the additional chain records information about at least one block of the blockchain in which the data on the additional chain is recorded.

9. The method of claim 1, wherein at least one of the minor shareholder nodes participates in a chain other than the additional chain as a minor shareholder node.

10. The method of claim 1, wherein the major shareholder nodes are not allowed to participate in a chain other than the additional chain as major shareholder nodes.

11. A method for generating a shard of a blockchain, the method comprising:
identifying a major shareholder node for an additional chain in consideration of a first share value corresponding to the additional chain, the first share value corresponding to a new asset;
identifying a minor shareholder node for the additional chain in consideration of a second share value corresponding to the additional chain, the second share value corresponding to the new asset;
selecting consensus nodes forming a consensus congress for the additional chain, the consensus nodes including any one or more of the major shareholder node, or the minor shareholder node, or a combination thereof,
performing, by the consensus nodes, distributed consensus; and
connecting an additional block to the additional chain in accordance with a result of performing the distributed consensus,
wherein each of the major shareholder node and the minor shareholder node has an old asset corresponding to the blockchain,
wherein the major shareholder node is for processing transactions, and no transaction is transferred to the minor shareholder node,
wherein the consensus nodes are selected based on an operation corresponding to a success probability of p, the operation performed as many times as the first share value for the major shareholder node and performed as many as the second share value for the minor shareholder node,
wherein the first share value is larger than the second share value,
wherein whether a new node is allowed to participate in the additional chain is determined based on a first total share value corresponding to the major shareholder node and a second total share value corresponding to the minor shareholder node,
wherein whether the new node is allowed to participate is determined based on a result of comparing the first total share value with a sum of the second total share value and a share value of the new node,
wherein the new asset and the old asset are of a same type and each of the new asset and the old asset is a respective portion of a total balance of each node, and
wherein the new asset is used for being the consensus nodes of the additional chain and the old asset is used for being consensus nodes of the blockchain.

* * * * *